United States Patent
Bächtle et al.

(10) Patent No.: US 9,433,221 B2
(45) Date of Patent: Sep. 6, 2016

(54) METHOD FOR PRODUCING A FOODSTUFF BY COEXTRUSION

(71) Applicant: ALBERT HANDTMANN MASCHINENFABRIK GMBH & CO. KG, Biberach (DE)

(72) Inventors: Manfred Bächtle, Schemmerhofen (DE); Armin Buechele, Laupheim (DE); Siegfried Reutter, Eberhardzell (DE); Markus Schliesser, Wain (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 279 days.

(21) Appl. No.: 14/087,022

(22) Filed: Nov. 22, 2013

(65) Prior Publication Data

US 2014/0170945 A1 Jun. 19, 2014

(30) Foreign Application Priority Data

Dec. 14, 2012 (EP) ..................... 12197108

(51) Int. Cl.
*A22C 11/00* (2006.01)
*A22C 11/02* (2006.01)
*A22C 13/00* (2006.01)

(52) U.S. Cl.
CPC .............. *A22C 11/02* (2013.01); *A22C 11/00* (2013.01); *A22C 13/0013* (2013.01); *A22C 2013/0023* (2013.01)

(58) Field of Classification Search
CPC ... A22C 11/00; A22C 11/006; A22C 11/008; A22C 11/02; A22C 11/029

USPC ............... 452/21–26, 30–32, 46–48, 51
See application file for complete search history.

(56) References Cited

U.S. PATENT DOCUMENTS

| | | | |
|---|---|---|---|
| 4,469,475 A | 9/1984 | Krysiak | |
| 4,905,587 A * | 3/1990 | Smithers | A22C 11/029 425/133.1 |
| 4,949,430 A | 8/1990 | Stanek | |
| 6,740,349 B2 * | 5/2004 | Franklin | A23B 4/005 426/277 |
| 6,761,944 B1 | 7/2004 | Hammer et al. | |
| 6,846,234 B1 * | 1/2005 | Hergott | A22C 11/02 452/32 |
| 7,591,717 B2 * | 9/2009 | Bachtle | A22C 11/0209 452/30 |
| 2009/0023373 A1 | 1/2009 | Bachtle et al. | |
| 2009/0029079 A1 | 1/2009 | Siddiqui et al. | |

(Continued)

FOREIGN PATENT DOCUMENTS

| | | |
|---|---|---|
| CN | 101347153 A | 1/2009 |
| CN | 101904346 A | 12/2010 |

(Continued)

OTHER PUBLICATIONS

Search report for EP12197108.9, dated Apr. 29, 2013.

(Continued)

*Primary Examiner* — Richard Price, Jr.
(74) *Attorney, Agent, or Firm* — Marshall, Gerstein & Borun LLP (57) ABSTRACT

A method for producing a foodstuff, in particular sausages, produced by coextrusion, including extruding a paste mass, coextruding a casing, and where a bonding agent is fed between paste mass and coextruded casing.

25 Claims, 5 Drawing Sheets

(56) References Cited

U.S. PATENT DOCUMENTS

| | | |
|---|---|---|
| 2009/0061052 A1 | 3/2009 | Visser et al. |
| 2011/0076364 A1 | 3/2011 | Auf Der Heide et al. |
| 2012/0321752 A1 | 12/2012 | Van De Nieuwelaar et al. |

FOREIGN PATENT DOCUMENTS

| | | |
|---|---|---|
| DE | 19628232 A1 | 1/1998 |
| EP | 0741973 A1 | 11/1996 |
| EP | 2016830 B1 | 6/2009 |
| FR | 2886104 A1 | 12/2006 |
| JP | 2009022279 A | 2/2009 |
| WO | WO-2011087359 A1 | 7/2011 |

OTHER PUBLICATIONS

The First Office Action, The State Intellectual Property Office of the People's Republic of China, Application No. 201310684649.5, dated Nov. 26, 2014.

Notice of Reasons for Rejection, Japanese Patent Office, Application No. P2013-215746, dated Oct. 29, 2014.

Official Action, Federal Institute of Industrial Property of the Federal Service for Intellectual Property, Patents and Trademarks, Ref. No. 2013145816/13(070928), dated Nov. 18, 2014.

Canadian Office Action for application No. 2,830,922, dated Feb. 17, 2015.

\* cited by examiner

METHOD FOR PRODUCING A FOODSTUFF BY COEXTRUSION

CROSS-REFERENCE TO RELATED APPLICATION

The present application claims the benefit of priority of European Application No. 12197108.9, filed Dec. 14, 2012. The entire text of the priority application is incorporated herein by reference in its entirety.

FIELD OF THE DISCLOSURE

The disclosure relates to a method for producing a foodstuff by coextrusion, and to the use of a bonding agent for the production of a foodstuff produced by coextrusion.

BACKGROUND

Coextrusion processes are used above all for the production of sausages. A corresponding coextrusion process is described, for instance, in EP 2016830B1. In that coextrusion method a paste mass, e.g. sausage meat, is covered by a gel which is cured by means of a fixing solution. After the coextrusion process the so produced sausage skein is twisted off or divided.

It happens frequently with coextruded foodstuffs that the coextruded casing, i.e. sausage casing becomes detached from the filled material, especially when the corresponding foodstuffs are heated in hot water. Such products are unacceptable to consumers.

The problem arises above all if a method is used where the casing is extruded onto a filling tube and is moved a distance towards the end of the filling tube so as to cure on the filling tube. The paste mass is then ejected through the filling tube into the casing. To minimize the coefficient of sliding friction between the filing tube and the casing to be produced a sliding agent, e.g. normal tap water, is fed between the filling tube and the extruded casing.

The sliding agent then also flows between the casing and the pasty filling material. This sliding agent may have a negative effect on the bonding between the casing and the filling material.

SUMMARY OF THE DISCLOSURE

Based on the foregoing it is one aspect of the present disclosure to provide a coextrusion method for a foodstuff which prevents the casing from becoming detached from the filling material, especially when the coextruded foodstuff is heated in water.

The direct introduction of a bonding agent between the paste mass and the coextruded casing leads to an improved bonding between the paste mass and the casing, so that the casing does not become detached from the paste mass in the further processing thereof. The feeding of the bonding agent between the paste mass and the casing has the advantage that the bonding agent is fed directly at the site where its effect is desired. Thus, in total, smaller amounts are required, as compared to admixing a corresponding material, for instance, to the paste material or the casing. The bonding agent is added before the casing solidifies.

A bonding agent is, for instance, an agent which increases the bonding between the casing and paste mass or, for instance, increases the number of the protein bonds, respectively cross-links in particular between the casing and the paste mass.

The method according to the disclosure can be applied if the casing is extruded directly onto the paste mass. The bonding agent then provides for a better bonding of the casing on the paste mass.

The method according to the disclosure is particularly advantageous if the casing, in particular sausage casing, is extruded onto a filling tube and moved a distance towards the end of the filling tube, wherein the bonding agent is introduced as sliding agent between the casing and the filling tube and the paste mass is ejected through the filling tube into the casing. The introduced agent then has two functions, viz. realizing an enhanced sliding ability of the extruded casing on the filling tube and ensuring an improved bonding between the paste mass and coextruded casing.

Advantageously, the bonding agent is liquid. If the bonding agent is liquid, it is suited as a sliding agent and, moreover, additives for an improved bonding are then added to the liquid.

Water is particularly suitable as a basis for the bonding agent, to which corresponding additives for an improved bonding are then added. In this context, basis, respectively main component implies an amount ≥80% by weight of water related to the ready-to-use bonding agent. Water is inexpensive, uncritical and consumable. Furthermore, it has very good sliding properties between the filling material and the coextruded casing. Of particular advantage is distilled water because the use of distilled water will not result in the calcifying of conduits and gaps etc.

According to a particularly preferred embodiment the bonding agent includes at least one protein. At least one protein implies either a particular type of protein or several different types of protein. The term protein implies in particular proteins having at least approximately 100 monomer units, or polypeptides having up to approximately 100 monomer units. If all three "layers", viz. paste mass, casing and bonding agent, contain proteins a cross-linking may be obtained between these there layers so as to ensure a good bonding between the mass and the casing. Identical or different proteins are usable in the three layers.

It is particularly advantageous if the bonding agent is a protein-type liquid (in particular water to which at least one protein was added as additive) and the protein concentration is preferably in a range of 3 to 30% by weight, in particular 5 to 20% by weight (% by weight in relation to the total amount, respectively ready-to-use bonding agent). If less than 3% are used the improvement of the bonding properties is not sufficient as no sufficient additional cross-linking will take place. If the protein concentration is too high the bonding agent is no longer suited as a sliding agent. A range of 3 to 30%, in particular 5 to 20% by weight has proved to be advantageous.

If all three "layers" contain at least one protein and the coextruded foodstuff is subjected to a thermal treatment the proteins can coagulate together. This may be the case, for instance, in the production of scalded sausage. Thus, a particularly good bonding of the casing on the paste mass is achieved. The casing contains, for instance, 1 to 10% by weight of protein.

According to a particularly advantageous embodiment the bonding agent includes at least one enzyme which is capable of producing the cross-linking within and of proteins. At least one enzyme implies a specific enzyme or different enzymes or enzyme types. Particularly suited is, for instance, transglutaminase. That is, if the bonding agent contains corresponding enzymes the reaction between the proteins of the casing and of the paste mass can be pushed.

The enzyme concentration is, for instance, approximately in a range of a maximum of 5% by weight of the ready-to-use bonding agent.

According to a preferred embodiment the casing includes a hydrocolloid. Examples for hydrocolloids usable in accordance with the disclosure include in particular polysaccharides, such as alginates, caragenes, starch and pectins—in particular at least one polysaccharide, e.g. alginate. This means that hydrocolloids contain substances that are dissolved in water as colloid and have a high gelling ability. At least one hydrocolloid, respectively at least one polysaccharide either means one certain hydrocolloid or polysaccharide, or several different types in each case. A corresponding gel-like casing cures very fast. The at least one hydrocolloid, in particular polysaccharide, may then be added protein, as described above. Such a casing is particularly well suited for the present disclosure where a favorable effect for the protein bonds is desired.

According to another embodiment the bonding agent equally includes at least one hydrocolloid, in particular at least one polysaccharide (then, in each case, preferably equally in gel form), in particular in a concentration of 0.2 to 5% by weight (in relation to the ready-to-use bonding agent). Too low a concentration is not enough for improving the bonding. If the concentrations are too high the problem arises that the bonding agent is no longer suited as a sliding agent for viscosity reasons. If the main component of the bonding agent, e.g. the water, in particular distilled water, is added at least one hydrocolloid, in particular at least one polysaccharide, as additive it has shown that this, too, may have a favorable effect on the bonding between the casing and the paste mass.

It is advantageous if such an amount of bonding agent is introduced between the paste mass and the coextruded casing that the cross-sectional ring area of the bonding agent amounts to 0.1 to 2%, in particular 0.5 to 1.5% of the cross-sectional area of the ejected paste mass in the production.

This amount is suited particularly well to improve the sliding ability of the coextruded casing on the filling tube and, at the same time, ensure a good bonding between the paste mass and the coextruded casing.

According to the present disclosure, therefore, the bonding agent is also employed as a sliding agent. Thus, the fed agent fulfills two functions. The bonding agent includes water, in particular distilled water, as main component to which either at least one protein and/or at least one hydrocolloid, in particular at least one polysaccharide and/or at least one enzyme, in particular transglutaminase, was added.

In the method according to the disclosure the amount of fed bonding agent is advantageously adjusted depending on the diameter of the extruded paste mass.

The viscosity of the bonding agent used preferably amounts to ≤20 mPas at a temperature of 15° C.

BRIEF DESCRIPTION OF THE DRAWINGS

The present disclosure will be explained in more detail below by means of the figures described below.

DETAILED DESCRIPTION OF THE PREFERRED EMBODIMENT

Figure 7:
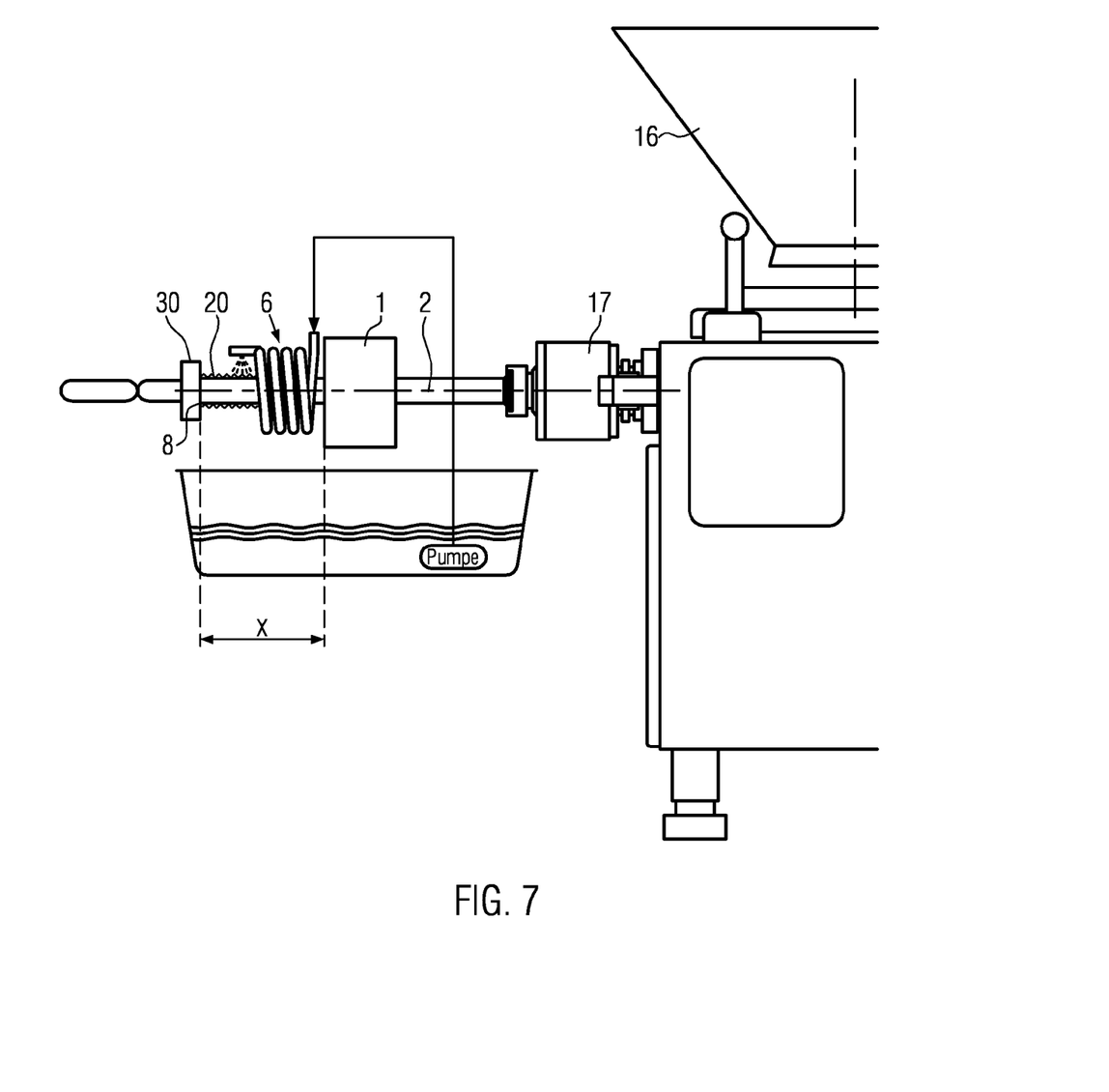
FIG. 7 shows a schematically represented filling machine for the method according to the disclosure.

As can be seen in FIG. 7, a filling machine comprises in a known manner a hopper 16, through which a paste mass, such as for instance sausage meat, is fed to a conveying mechanism positioned below the hopper. The conveying mechanism brings the paste mass under pressure into a filling tube 2, so that it is pushed into a casing for the production of sausages. With the aid of the coextrusion head 1 also the sausage casing 20 can be produced for the sausages. For the solidification of the casing a device 6 is further provided for feeding fixing solution for the ejected casing. Here, the device is formed as an annular spray 6 through which the casing to be solidified is passed on the filling tube. The annular spray is connected to a feeding means for a fixing solution which is fed by means of a pump from a further storage container to the annular spray.

Downstream of the filling tube end 8 various devices 30 may be arranged, as illustrated schematically in FIG. 7. For instance, a dividing device may be provided, which divides off the produced sausage skein when it is, for instance, twisted about its longitudinal axis with the aid of the drive 17. A dividing device dividing off, for instance, the paste mass of the sausage skein into individual sausages using displacement elements and/or a conveyor conveying the produced sausage skein, respectively the individual sausages further in the transport direction T may equally be arranged downstream of the filling tube. However, these various devices will not be discussed in more detail below.

Figure 1:
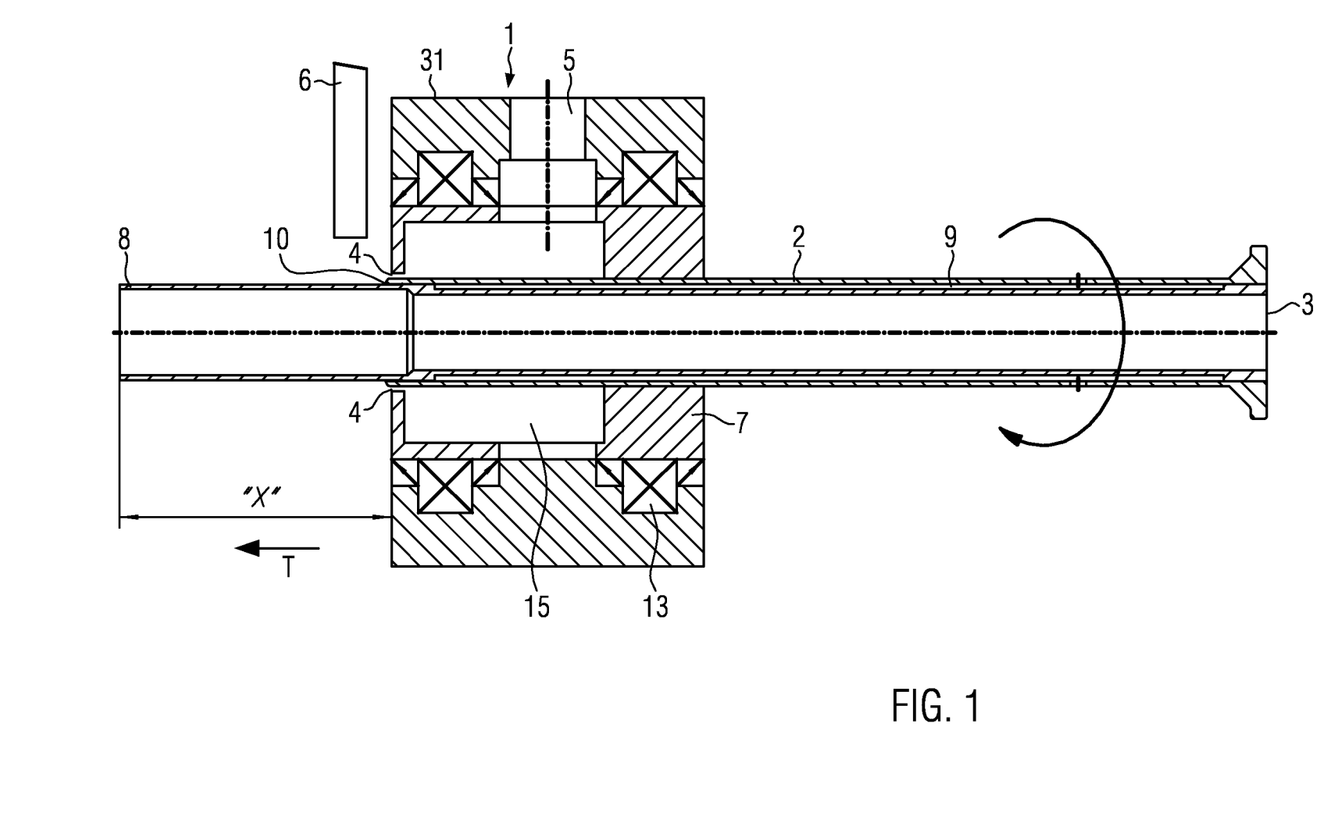
FIG. 1 shows a section through a coextrusion head according to a first embodiment of the present disclosure.

FIG. 1 shows a section through a coextrusion head 1 suited for a first embodiment according to the present disclosure. As can be seen in FIG. 1, the coextrusion head 1 comprises a housing 31, in which the extrusion die 7 is pivotably supported by appropriate bearings 13 for the ejection of casing material. The housing 31 has a feeding means 5 for the casing mass material. The extrusion die 7 comprises a die cavity 15 through which the casing material can be extruded via the annular gap 4 onto the filling tube 2. The filling tube 2 extends through the extrusion die 7. Together with the extrusion die, the filling tube 2 is pivotably supported about the longitudinal axis of the filling tube, as indicated by the arrow in FIG. 2, and can be rotated for a twisting-off process for dividing off a produced sausage skein. The coextrusion head 1 includes, in this design, a filling tube 2 extended beyond the annular gap 4. The filling tube 2 protrudes by a distance X beyond the annular gap. The distance X is preferably 10 to 200 mm long, but can also be selected longer. Thus, the casing can be extruded through the annular gap 4 onto the filling tube 2, wherein the casing can be solidified on the distance X. The extruded casing moves in the direction of the filling tube end 8 in the transport direction T. For the curing a device is provided here for feeding fixing solution 6, which is preferably arranged around the filling tube as illustrated in FIG. 7, and applies the fixing solution externally to the ejected casing material. Thus, the casing, formed for instance of a polysaccharide gel (e.g. alginate gel), can be solidified by the application of a fixing solution, e.g. a calcium chloride solution. At the end 8 of the filling tube 2 the ejected casing material is sufficiently solidified and can be passed to the following processing stages. The paste mass can be fed with pressure through filling means 3 to the filling tube and ejected into the casing. The paste mass is pushed into the casing 20, so that the casing 20 is pulled off the filling tube 2 so that the casing, respectively the ejected casing material is moved in the transport direction T. In order for the ejected casing material, respectively casing to be well movable in the transport direction T it is advantageous if the filling tube 2 has good sliding properties in the external region. Preferably, the surface of the filling tube is formed at least in the region of the distance X such that it has a sliding friction coefficient μ in a range of 0.01 to 0.1.

According to the present disclosure, as shown in FIG. 1, the sliding friction coefficient between the filling tube and the ejected casing is further minimized by introducing a bonding agent, which simultaneously also serves as sliding agent, between the filling tube 2 and the extruded casing. To this end, a sliding agent device is provided, which comprises a feeding means 9 for the bonding agent, respectively sliding agent 23. The feeding means 9 is, in the present case, designed as a channel in the filling tube 2. In particular, the channel runs annularly in the filling tube wall. Another annular gap 10 is arranged in the region of annular gap 4 around the outer surface of the filling tube 2. To this end, the filling tube 2 has a smaller diameter in the region behind the further annular gap 10 than the filling tube 2 in a region in front of the annular gap 10. Through the annular gap 10 an internal injection of the bonding, respectively sliding agent 23 can be realized between the ejected casing material and the surface of the filling tube 2. Thus, the ejected casing material, respectively the casing to be produced can easily slide on the filling tube 2 towards the filing tube end 8. The injection of the sliding agent thus serves as an aid to reduce the friction coefficient on the surface of the filling tube. For this purpose, additional holes may be arranged along the distance X through which bonding, respectively sliding agent may be additionally injected in order for the sliding film not to be interrupted along the distance X. The device for feeding the bonding agent, respectively sliding agent further comprises a non-illustrated device for adjusting the fed amount of bonding agent, e.g. a variable volume pump in a feeding line, so that the fed amount of bonding agent, and thus also the thickness of the applied sliding film is adjustable per unit time.

When the paste mass is ejected through the filling tube 2 into the casing 20 the bonding, respectively sliding agent is then also introduced between the casing 20 and the paste mass 22.

Due to the fact that the bonding agent is now also provided between the paste mass 22 and the casing the bonding between the paste mass and the casing is improved in such a manner that the casing does not become detached from the paste mass, especially when the produced foodstuff product is heated, for instance, in hot water. Due to the fact that the bonding agent is introduced directly between the paste mass and the coextruded casing it is fed precisely at the site where an effect is desired. Thus, smaller amounts of bonding agent are required as compared to the case where the agent could be added, for instance, to the paste mass. Thus, the bonding agent has two functions. On the one hand, the improvement of the bonding between paste mass and coextruded casing and, on the other hand, the function as sliding agent. In its function as sliding agent the bonding agent should have a viscosity <=20 mPas at temperatures of 15° C.

Figure 2:
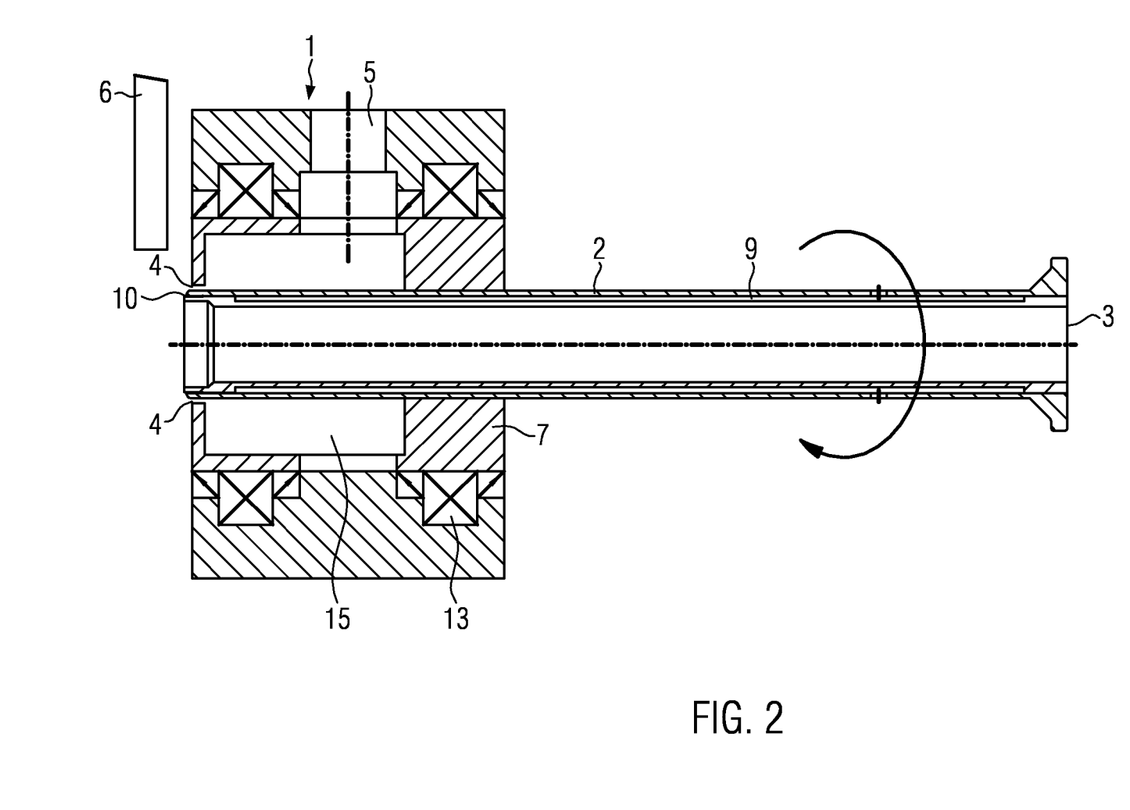
FIG. 2 shows a section through another embodiment of a coextrusion head according to the present disclosure.

However, the method is equally suited if the casing is applied directly onto the ejected paste mass, as can be seen in FIG. 2. The embodiment shown in FIG. 2 corresponds to the embodiment shown in FIG. 1. However, the casing is here applied to the paste mass directly through the annular gap 4. In the same fashion as described in connection with FIG. 1 the bonding agent 23 is ejected through the channel 9 and the annular gap 10, in this case directly onto the ejected paste mass, however, and below the ejected casing 20. In this case, the bonding agent does not have the function of a sliding agent, but merely has the function of the bonding agent.

A first embodiment according to the present disclosure will now be explained in more detail in connection with FIGS. 1 to 3.

In the first embodiment a gel made of a polysaccharide-protein mixture is used as material for the casing 20, e.g. an alginate-protein gel. That is, the gel includes at least one polysaccharide and at least one protein. A corresponding gel cures very fast, while the protein in the gel can bond with proteins in the bonding agent 23. The polysaccharide-protein mixture has, for instance, a protein content of 1 to 10% by weight (in relation to the total amount, viz. the ready-to-use casing material). One example for a composition is, for instance:

5% by weight of alginate, 1% of guar, 4% by weight of protein, small constituents of preservatives, <2% by weight of at least another polysaccharide (e.g. pectin), and water (the rest of approximately 90% by weight).

Figure 3:
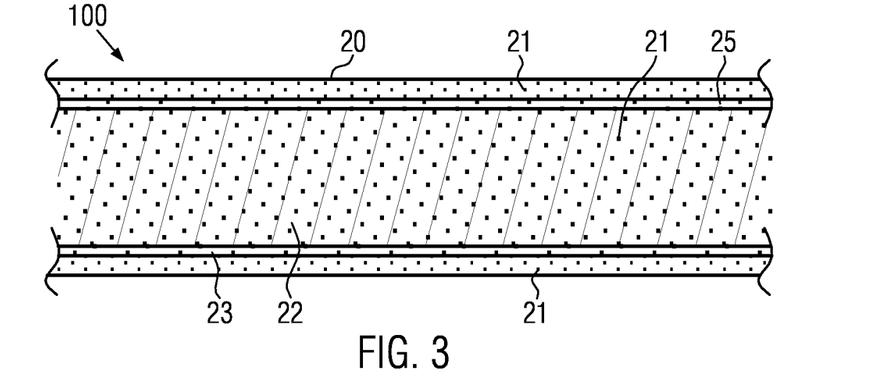
FIG. 3 shows, roughly schematically, a longitudinal section through a coextruded foodstuff product according to a first embodiment of the present disclosure.

The bonding agent 23, too, includes in this embodiment, as can be seen in FIG. 3, at least one protein 21. The bonding agent is liquid and serves simultaneously as sliding agent in the embodiment shown in FIG. 1. According to a preferred embodiment the bonding agent particularly includes, for instance, water (>=80% by weight of the ready-to-use bonding agent), in particular distilled water, as the main component 25. At least one protein 21 is added to the water as additive. The bonding agent may include other additives as well. The protein concentration in the ready-to-use bonding agent is in a range of 3 to 30% by weight, in particular 5 to 20% by weight. In higher protein concentrations a sufficient sliding property of the casing on the filling tube would no longer be ensured. If the protein contents are too low the improvement of the bonding would not be sufficient.

Proteins coming into question for the casing 20 and the bonding agent 23 are, for instance, those that are obtained from the following sources or are added in this form: chicken egg protein, blood plasma, wheat protein or mixtures thereof.

According to this method the paste mass, too, includes proteins. In this case, the protein concentrations amount to at least 5 to 30% by weight. In the case of meat products and sausage products the paste mass contains proteins anyway, e.g. in the form of muscle proteins, respectively collagen proteins which are then able to bond with the proteins in the bonding agent 23.

Figure 6:
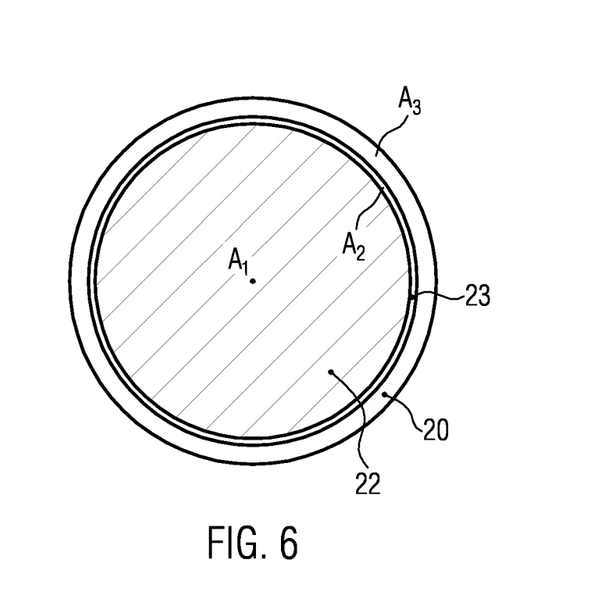
FIG. 6 shows, roughly schematically, a cross-section through a coextruded foodstuff product.

As can particularly be seen in FIG. 6 the amount of added bonding agent is adjusted depending on the diameter of the extruded paste mass 22, e.g. by the above-explained adjusting device. The cross-sectional annular area A2 of the bonding agent 23 amounts to 0.1 to 2%, in particular 0.5 to 1.5% of the cross-sectional area A1 of the ejected paste mass. The cross-sectional annular area A3 of the casing may amount to 2 to 8% of the cross-sectional area of the ejected paste mass.

In one specific example of the first embodiment, using a filling system by Handtmann, e.g. type KVLSH 162, the following materials were used.

Casing Material:
  5% by weight of alginate, 1% of guar, 4% by weight of protein, small constituents of preservatives, <2% of pectin, and water (the rest of approximately 90% by weight)

Bonding Agent:
  distilled water: 78% by weight,
  proteins (chicken egg protein) 12% by weight Paste Mass:
  scalded sausage meat
  diameter of the extruded mass=20 mm
  fixing solution=20% CaCl solution
  casing material thickness=0.25 mm
  ejection rate of the paste mass=460 kg/h, ejection rate of the casing=23 kg/h, ejection rate of the bonding agent=3.6 kg/h The bonding between the casing 20 and the paste mass 22 may be further encouraged if the coextruded product is subjected to a thermal treatment after the casing 20 has cured, e.g. up to 15 minutes to up to 70° C. This can apply, for instance, to the production of scalded sausage. The proteins of the paste mass and the bonding agent as well as the proteins of the bonding agent and the proteins of the casing can then coagulate together, resulting in a particularly permanent bonding.

Figure 4:
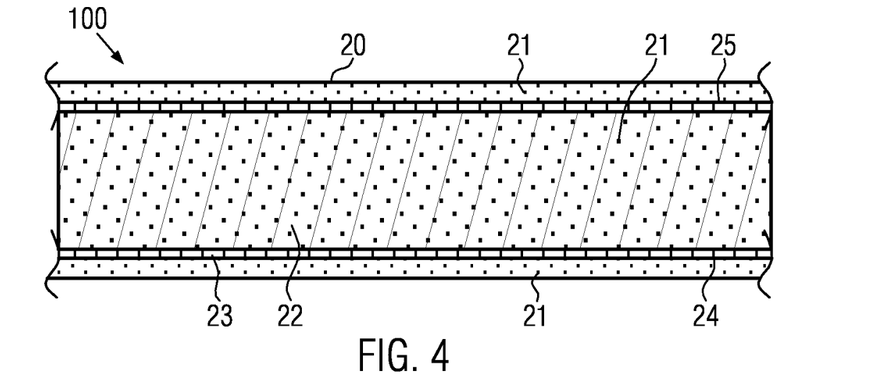
FIG. 4 shows, roughly schematically, a longitudinal section through a coextruded foodstuff product according to a second embodiment of the present disclosure.

The embodiment described in connection with FIG. 4 substantially corresponds to the first embodiment, except for the composition of the bonding agent 23. The bonding agent 23 in this embodiment contains at least one enzyme 24 producing the cross-linking between proteins in the casing and the paste mass. In this case, particularly transglutaminase (protein glutamine γ-glutamyltransferase) is suited. The enzyme content in the bonding agent amounts to a maximum of 5% by weight of the ready-to-use bonding agent. Advantageously, the main component in this case, too, is water, in particular distilled water. The bonding agent 23 allows the cross-linking between the proteins 21 in the casing 20 and the proteins 21 in the paste mass 22 to be pushed. Thus, a good bonding between the paste mass 22 and the casing 20 is guaranteed and, at the same time, the bonding agent 23 may also well be used as sliding agent in the case of an embodiment as shown in FIG. 1. In this embodiment at least the casing and the paste mass should include at least one protein.

Figure 5:
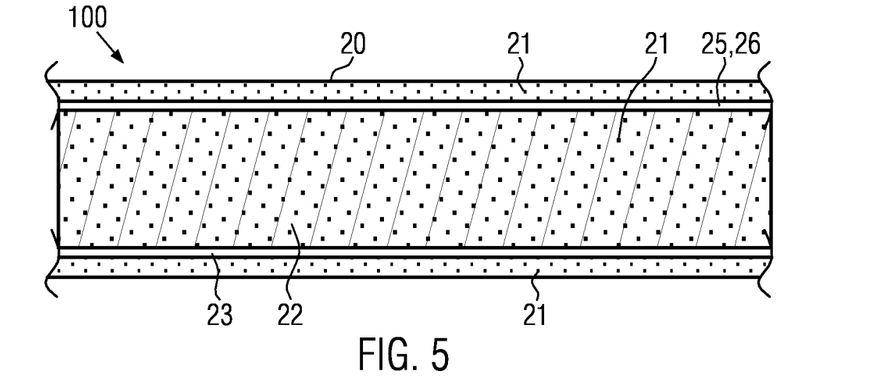
FIG. 5 shows, roughly schematically, a longitudinal section through a coextruded foodstuff product according to a third embodiment of the present disclosure.

The embodiment shown in FIG. 5, too, corresponds to the embodiment of FIG. 3 described in detail, except for the composition of the bonding agent 23. In this embodiment the bonding agent includes at least one hydrocolloid, in particular at least one polysaccharide 26, e.g. alginate, preferably in gel form. In this case, too, the bonding agent 23 advantageously contains water as the main component, in particular distilled water, wherein the ready-to-use bonding agent contains 0.2 to 5% by weight of polysaccharide, e.g. alginate. In this case, too, the bonding between the casing 20 and the mass 22 is improved. In particular at least one polysaccharide, e.g. in the form of starch, pectin or alginate, is usable as hydrocolloid for the bonding agent.

The embodiments described in connection with FIGS. 3 and 4 have in common that they improve the bonding by virtue of an increase of the number of protein bonds. The embodiment described in connection with FIG. 5 encourages the bonding owing to an improved cross-linking. It is also possible to use a bonding agent in which at least two of the additives added in the embodiments shown can be combined.

What is claimed is:

1. A method for producing a foodstuff produced by coextrusion, the method comprising the steps of:
    extruding a paste mass, coextruding a casing, feeding a bonding agent between the paste mass and the coextruded casing, wherein in coextruding the casing, the casing is extruded onto a filling tube and moved a distance towards the end of the filling tube, the bonding agent is introduced as a sliding agent between the casing and the filling tube, and the paste mass is ejected through the filling tube into the casing, and
    wherein the bonding agent increases the bonding between the casing and the paste mass.

2. The method according to claim 1, wherein the bonding agent is liquid.

3. The method according to claim 1, wherein the bonding agent includes water.

4. The method according to claim 1, the bonding agent, the casing and the paste mass each include at least one protein.

5. The method according to claim 1, wherein the bonding agent (23) is a protein-containing liquid and the protein concentration is in a range of 3 to 30% by weight.

6. The method according to claim 5, wherein the protein concentration is in a range of 5 to 20% by weight.

7. The method according to at least claim 4, wherein the coextruded foodstuff is subjected to a thermal treatment.

8. The method according to claim 1, wherein the bonding agent includes at least one enzyme.

9. The method according to claim 8, wherein the at least one enzyme is transglutaminase.

10. The method according to claim 1, wherein the casing includes at least one hydrocolloid.

11. The method according to claim 10, and wherein the bonding agent includes at least one hydrocolloid.

12. The method according to claim 11, wherein the at least one hydrocolloid comprises at least one polysaccharide.

13. The method according to claim 11, wherein the at least one hydrocolloid is in a concentration of 0.2 to 5% by weight.

14. The method according to claim 10, wherein the at least one hydrocolloid comprises at least one polysaccharide.

15. The method according to claim 1, wherein a cross-sectional ring area of the bonding agent amounts to 0.1% to 2% of a cross-sectional area of the ejected paste mass.

16. The method according to claim 15, wherein the cross-sectional ring area of the bonding agent amounts to 0.5% to 1.5% of the cross-sectional area of the rejected paste mass.

17. A method of using a bonding agent for the production of a foodstuff produced by coextrusion, wherein a paste mass is ejected, a casing is coextruded, and a bonding agent is fed between the paste mass and the coextruded casing, wherein in ejecting the paste mass,
    the paste mass is ejected from a filling tube and the casing is extruded onto the filling tube and moved a distance towards the end of the filling tube, and
    the bonding agent is used as a sliding agent, and
    wherein the bonding agent increases the bonding between the casing and the paste mass.

18. The method of using a bonding agent according to claim 17, wherein the bonding agent includes water as main component to which either
    at least one protein, at least one hydrocolloid,
at least one enzyme, and
a combination thereof,
was added.

19. The method of using a bonding agent according to claim 18, wherein the water is distilled water.

20. The method of using a bonding agent according to claim 18, wherein the at least one hydrocolloid comprises at least one polysaccharide.

21. The method of using a bonding agent according to claim 18, wherein the at least one enzyme comprises transglutaminase.

22. The method according to claim 1, wherein the amount of fed bonding agent is adjusted depending on the diameter of the extruded paste mass.

23. The method according to claim 1, wherein the viscosity of the bonding agent used is <20 mPas.

24. The method according to claim 1, wherein the foodstuff is sausage.

25. The method according to claim 1, wherein the water is distilled water.

* * * * *